(12) United States Patent
Peters et al.

(10) Patent No.: US 9,301,446 B2
(45) Date of Patent: Apr. 5, 2016

(54) ARRANGEMENT AND METHOD FOR THE ANTICIPATORY ASSESSMENT OF PLANTS TO BE GATHERED WITH A HARVESTING MACHINE

(75) Inventors: Ole Peters, Enkenbach-Alsenborn (DE); Benedikt Jung, Kaiserslautern (DE); Klaus Hahn, Mannheim (DE); Cristian Dima, St. Ingbert/Rohrbach (DE)

(73) Assignee: DEERE & COMPANY, Moline, IL (US)

( * ) Notice: Subject to any disclaimer, the term of this patent is extended or adjusted under 35 U.S.C. 154(b) by 614 days.

(21) Appl. No.: 13/585,539

(22) Filed: Aug. 14, 2012

(65) Prior Publication Data
US 2013/0205733 A1 Aug. 15, 2013

(30) Foreign Application Priority Data
Oct. 28, 2011 (DE) .......................... 10 2011 085 380

(51) Int. Cl.
*A01D 41/127* (2006.01)
(52) U.S. Cl.
CPC .................................. *A01D 41/127* (2013.01)
(58) Field of Classification Search
USPC ................ 56/10.2 R, 10.2 A, 10.2 B, 10.2 C, 56/DIG. 15; 460/1–7; 701/50
See application file for complete search history.

(56) References Cited

U.S. PATENT DOCUMENTS

| 4,408,618 A * | 10/1983 | Witzel .......................... 460/80 |
| 6,381,932 B1 * | 5/2002 | Clauss ...................... 56/10.2 J |
| 2003/0004630 A1 * | 1/2003 | Beck .............................. 701/50 |
| 2005/0279070 A1 * | 12/2005 | Pirro et al. ..................... 56/14.6 |

FOREIGN PATENT DOCUMENTS

| DE | 10346541 A1 | 7/2005 |
| DE | 102007007040 A1 | 8/2008 |
| DE | 102008043716 A1 | 5/2010 |
| EP | 2143316 A1 | 1/2010 |

OTHER PUBLICATIONS

European Search Report, dated Feb. 6, 2013 (4 pages).

* cited by examiner

*Primary Examiner* — Alicia Torres (57) ABSTRACT

A arrangement is provided for the anticipatory assessment of plants to be gathered by a harvesting machine, disclosed as a combine harvester, and includes a non-contact sensor arrangement for the generation of signals representing at least one characteristic of plants located ahead of the machine, a measurement device for recording at least one characteristic of the plants actually gathered by the machine, and an evaluation device for producing calibration data with the aid of signals generated by the measurement device and from statistical parameters derived from the signals of the sensor arrangement and for the calculation of the characteristic of plants to be gathered with the aid of statistical parameters, which were derived from the signals of the sensor arrangement, corresponding to the plants to be gathered, and with the aid of the calibration data.

13 Claims, 3 Drawing Sheets

ARRANGEMENT AND METHOD FOR THE ANTICIPATORY ASSESSMENT OF PLANTS TO BE GATHERED WITH A HARVESTING MACHINE

FIELD OF THE INVENTION

The invention refers to an arrangement for the anticipatory assessment of plants to be gathered with a harvesting machine.

BACKGROUND OF THE INVENTION

With harvesting machines, a measurement of crop throughput is sensible for the purpose of an automatic adjustment of crop conveyors and or crop processing devices. The crop throughput is also frequently measured for the purpose of the management of partial areas. Furthermore, with the aid of the measured crop throughput, the advance speed of the harvesting machine on a field can be adjusted by a corresponding control in such a we that a desired crop throughput is attained, which, for example, corresponds to an optimal utilization of the harvesting machine. It is normal to determine crop throughput with corresponding sensors in the harvesting machine. Since the measurement is carried out only after the crops were gathered by the harvesting machine, a sudden change of the crop throughput with such sensors can no longer be compensated for by a corresponding adaptation of the traveling speed, which can result in a reduced or excess loading of the crop processing devices or even in the processing devices becoming plugged.

DE 10 2008 043 716 A1 describes a harvesting machine equipped with a device to record the number of plants on a field, the device including a transmitter, which radiates electronic waves in the visible or near-infrared range from the machine at a forward and downward inclination onto plants that are in front of the machine, and a receiver, which works with a local or angular resolution and which receives waves reflected by the plants in the plant group and/or by the earth. An evaluation device determines the transit time of the waves of the transmitter to the recipient at various points along a measurement direction running transverse to the forward direction of travel and determines the number of plants with the aid of the variation of the recorded transit times. A recording of the plant density is based on the fact that with dense groups of plants, almost all waves are reflected by the foliage of the crops or plants, which means a rather low variation of the recorded transit times, whereas with thin plant densities, a greater fraction of the waves is reflected by the earth, which, at the pertinent sites, results in substantially longer transit times of the light and greater variations of the transit times along the measurement direction. The density of the plant group is determined with the aid of statistical parameters (that is, the variations in the transit times of the waves), using a calibration table established by experiments and permanently stored, determined and multiplied with the vertical area of the plants, so as to ascertain the number of plants to be expected during harvesting. Taking into consideration the cutting height and the type of plant, a calibration of the detected number of plants follows with the aid of the measurement values of a crop throughout sensor of the harvesting machine, wherein for the adjustment of the calibration data, one has recourse to an expert system or a neuronal network, and the calibration data can again be determined from time to time, so as to take into account changed ambient conditions. Here, the connection between the statistical parameters and the density of the plants is accordingly determined by experiments and permanently pre-specified, so that it does not lead to optimal results under all operational conditions.

SUMMARY OF THE INVENTION

Object of the Invention

The object on which the invention is based is to be found in making available an improved device and a method for determining the number of plants on a field.

Attaining the Object

This object is attained in accordance with the invention by the teaching of Patent Claims 1 and 12, wherein in the other patent claims, features are given, which further develop the way to attain the object in an advantageous manner.

An arrangement for the anticipatory assessment of plants to be gathered by a harvester comprises a sensor arrangement with a non-contact interaction with plants on a field, the sensor arrangement generating signals representing at least one characteristic of the plants. In addition to the sensor arrangement, there is provided a measurement device for the recording of one characteristic of the plants actually gathered by the harvesting machine, and an evaluation device for the production of calibration data, with the aid of signals of the measurement device and from statistical parameters derived from the signals of the sensor arrangement and for the calculation of the characteristic of plants to be gathered with the aid of statistical parameters, which were derived from the signals of the sensor arrangement, corresponding to the plants to be gathered, and with the aid of the calibration data. The evaluation device automatically determines connections between the statistical parameters cleaved from the signals of the sensor arrangement and the signals of the measurement device and takes into consideration these determined connections later during the calculation of the characteristic of the plants to be gathered.

Accordingly, the mode of operation of the arrangement in accordance with the invention is such that, at first, a learning process takes place. In this learning process, signals are conducted from a sensor device to the evaluation device; the sensor device records without contact one or more characteristics of (standing or lying, that is, cut) plants on a field. The evaluation device determines one or more statistical parameters of the plants with the aid of these signals. Furthermore, a measurement device likewise records one or more characteristics of the plants that have been gathered by a harvesting machine, and in particular, precisely those plants that are investigated beforehand by the sensor device. The same characteristic that the sensor device already recorded can be recorded thereby or another characteristic. Thus, two different measurement devices with respect to the characteristics of the plants are available to the evaluation device, namely, the measurement values from the sensor device, which were recorded without contact and which are clouded with a certain degree of uncertainty because of the mode of operation of the sensor device that operates without contact, and the measurement values of the measurement device, which were recorded on board the harvesting machine, and which are quite sufficient. The evaluation device determines with these measurement values calibration data with which, after the end of the learning process, the measurement values of the sensor device (or the statistical parameters derived therefrom) can be converted in one application process into characteristics of the plants with the greatest accuracy possible. By means of the calibration produced in the learning process, the characteristic(s) of the plants is/are determined in the application process in an anticipatory manner and with sufficient accuracy, which facilitates an adaptation of parameters of the harvesting machine to the characteristic(s) of the plants.

In accordance with the invention, the proposal is made that during the learning process, statistical parameters of the plants be derived from the signals of the sensor device and connections between these statistical parameters and the signals of the measurement device be learned. Thus, differently from the state of the art (DE 10 2008 043 716 A1), not only the connection between a determined characteristic of the plants (for example, number of plants per area), which was determined with the aid of the signals of the sensor device and the statistical parameters derived therefrom, and the corresponding signals of the measurement device is determined, so as to set up calibration data, but rather the statistical parameters themselves, derived from the signals of the measurement device, are linked with the signals of the measurement device, so as to learn the connections between the statistical parameters and the signals of the measurement device and to take them up in the calibration data. In the application process, which can occasionally coincide with the learning process, then, the statistical parameters (perhaps together with other parameters of the signals of the measurement device) are converted into the sought characteristic(s) of the plants with the aid of the calibration data. In this way, the accuracy of the determined characteristic(s) of the plants is improved.

The characteristic of the plants to be determined can be the group density of all the plants (measured in volume or mass per area) and/or the grain and/or straw density of the plants (also measured in volume or straw per area) and/or the moisture of the plants.

The measurement device can interact directly with the plants gathered or processed by the harvesting machine, that is, can be constructed as a crop sensor and, for example, directly record the layer thickness or mass of the plants gathered by the harvesting machine. Alternatively, or additionally, the measurement device can record an operating value of a crop conveyor and/or a crop processing device, for example, the driving power of an inclined conveyor and/or a threshing device and/or losses of a separating device and/or losses of a cleaning device and/or a returns volume and/or the cleanness of refined grain. If the characteristic of the plants to be determined is moisture, the measurement device can be a suitable moisture sensor.

The sensor arrangement can be placed on the harvesting machine and look out onto the group of plants before the harvesting machine from a suitable point (for example, a cabin, a collecting conveyor or a harvesting attachment). It would be conceivable to place on a separate land vehicle or aircraft or on a satellite. The separate land vehicle can be an unmanned robot, which moves around or leaves a field to be harvested, or a fertilizing or spraying vehicle, which moves around on the field before the harvesting and simultaneously collects sensor data during the fertilizing or spraying work operation. The sensor arrangement can also be placed on a manned or unmanned vehicle or helicopter satellite.

The sensor arrangement can be a camera. The statistical parameters are then, for example, texture parameters and/or color histograms derived from the image (or partial images) of the camera. The camera can also be constructed as a stereo camera or 3D camera that is, a photon mixed camera).

The sensor arrangement can alternatively or additionally comprise a range finder, which scans the plants with electromagnetic waves, that is, a radar or laser range finder. The statistical parameters are then, for example, variables derived from the distance signals of the sensor arrangement, such as echo intensities and/or purse shapes and/or signal scattering (that is, widths of the chronological variations of the reflected signals) and/or the polarization of the electromagnetic waves and/or frequency shifts of the electromagnetic waves and/or changes in the course of time of those variables that were derived from the distance signals of the sensor arrangement.

One possibility is to adjust or regulate, using the characteristic of the plants to be gathered as determined with the evaluation device, at least one operational parameter of the harvesting machine, in particular, the advance speed and/or the size of the thresher basket gap and/or the rotating speed of a cleaning blower and/or the size of a sieve opening.

Preferably, during the application of the calibration data, the evaluation device takes into consideration the position of the harvesting machine in the field and/or known characteristics of the field. That means that previously determined calibration data were stored with information regarding the position where the data were gathered. If the harvesting machine then again approaches this position either in the same harvesting process or with a later (for example, next year's) harvesting process, then these calibration data are again used. Analogously, other characteristics of the field and the pertinent position of the field (for example, type of soil, elevation above sea level, magnitude and orientation of a slope inclination) with the calibration data can be stored, and the calibration data are again recalled with the aid of these characteristics. If several harvesting machines simultaneously work on one field and are each equipped with an arrangement in accordance with the invention, they can also exchange wirelessly among one another the calibration data and the aforementioned pertinent information regarding the position in the field and/or the characteristics of the field. In this regard, it should be mentioned that instead of using position and/or field characteristics-dependent calibration data, it is also possible to select the relevance of the calibration data (either in stages or continuously) depending on the position or field characteristic, that is, the calibration data to the extent they are dependent on the distance to the position where the data were obtained.

In the problem to be solved by the evaluation device—correlating the unknown characteristic(s) of the crop with the known statistical parameters (and perhaps other measurement values of the sensor device), states (characteristic(s) of the crop) are invisible, but data (statistical parameters) dependent on the states are visible. For the solution of such a problem, there is the possibility of using a hidden Markov model, although any other Bayes factor model can also be used.

The arrangement in accordance with the invention can be used, in particular, with self-propelled harvesting machines or with harvesters pulled by a vehicle or attached thereon, for example, combine harvesters, baling presses, or field choppers.

BRIEF DESCRIPTION OF THE DRAWINGS

Embodiment Example

An embodiment example of the invention described in more detail below is shown in the drawings, wherein.

DESCRIPTION OF THE PREFERRED EMBODIMENT

Figure 1:
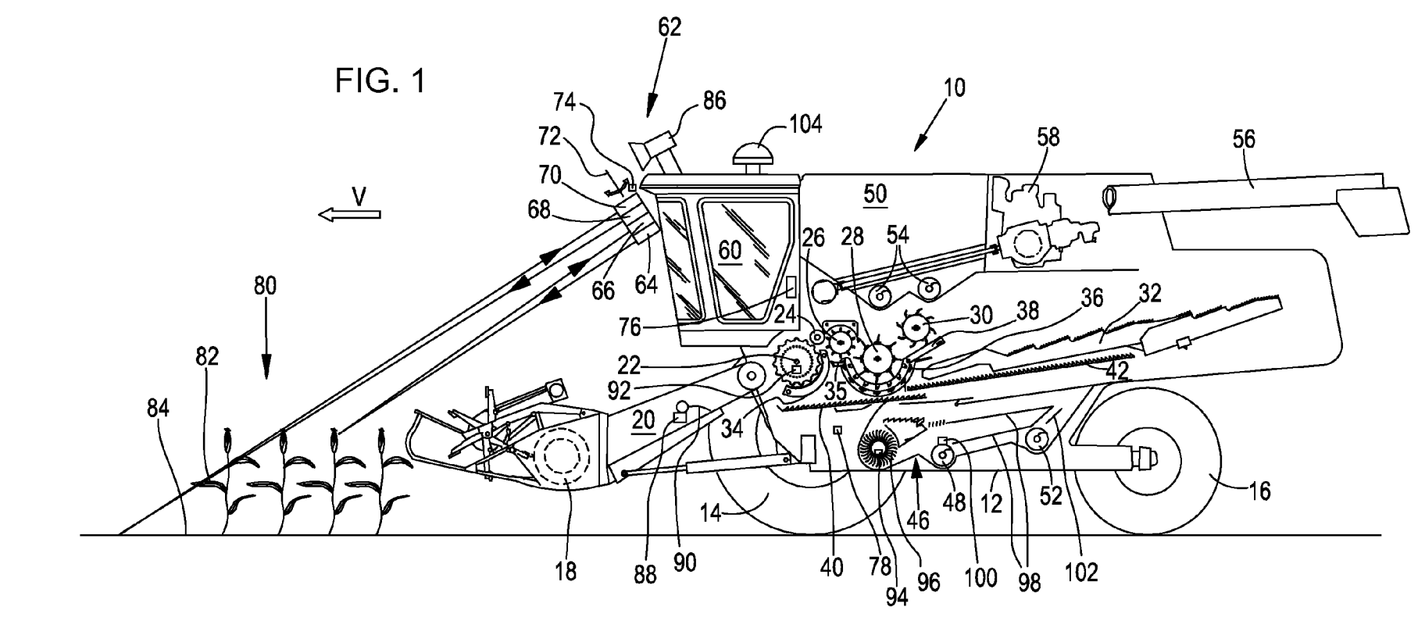
FIG. 1 is a side view of a harvesting machine with an arrangement in accordance with the invention for the anticipatory assessment of plants gathered with a harvesting machine.

FIG. 1 shows a harvesting machine 10 in the form of a self-propelled combine harvester having a frame 12, which is supported on the ground via driven front wheels 14 and back wheels 16 that can be steered, and which is moved by those wheels. The wheels 14 are made to rotate by means of a driving means (not shown), so as to move the harvesting machine 10, for example, over a field to be harvested. Direction terms, such as "front" and "back" refer in the following to the forward direction of movement V of the harvesting machine 10 during harvesting operation.

A crop harvesting device 16 in the form of a cutting mechanism is connected in a detachable manner to the front end area of the harvesting machine 10, so as to harvest threshable cereals or other threshable stalks from the field, and to conduct them upwards and backwards through an inclined conveyor 20 to a multi-drum threshing mechanism, which, arranged successively in the direction of crop flow through the machine 10, comprises a threshing drum 22, a stripping drum 24, a conveying drum 26, which works from above, a tangential separator 28, and a turning drum 30. Downstream from the turning drum 30, there is a straw walker 32. The threshing drum 22 is surrounded by a threshing basket 34 in its lower and back area. Below the conveying drum 26, there is a cover 35 which is dosed or provided with openings, whereas above the conveying drum 26, there is a fixed cover and below the tangential separator 28, there is a separating basket 36 with adjustable finger elements. Below the turning drum 30, there is a finger rake 38.

The grain-containing and impurities-containing mixture, which goes through the threshing basket 34, the separating basket 36, and the straw walker 32, arrives via the conveying trays 40, 42 at a cleaning device 46 having a blower 96 and sieve 98. Cereal cleaned by the cleaning device 46 is conducted by means of a grain auger 48 to an elevator (not shown), which conveys it into a grain tank 50. A returns auger 52 returns non-threshed head parts through another elevator (not shown) to the threshing process. The chaff can be thrown on the back side of the upper sieve 98 by a rotating chaff spreader, or it is discharged by means of a straw chopper (not shown), located downstream from the straw walker 32. The cleaned cereal from the grain tank 50 can be unloaded by an unloading system with cross augers 54 and an unloading conveyor 56.

The aforementioned systems are driven by means of a combustion engine 58 and are controlled by an operator from a driver's cabin 60. The different devices for threshing, conveying, cleaning, and separating are located within the frame 12. Outside the frame 12, there is an outer shell, which for the most part can be folded up. It remains to be noted that the multi-drum threshing mechanism depicted here is only one embodiment example. It could be replaced by a single transverse threshing drum and a subordinate separating device with a straw walker or one or more separating rotors or a threshing and separating device working in the axial flow.

A sensor arrangement 62 is located on the front side of the driver's cabin 60 in the vicinity of the roof; the sensor arrangement is connected to an evaluation device 76. The sensor arrangement 62 could alternatively be placed on the crop harvesting device 18. The evaluation device 76 is connected to a speed-specifying device 78 for example, an adjusting device for a swash plate of a hydraulic pump, which is connected with a hydraulic motor so as to conduct hydraulic fluid, which drives the wheels 14) which is set up to adjust the traveling speed of the harvesting machine 10.

The sensor arrangement 62 comprises a first transmitter 64, a first receiver 66, a second transmitter 68, and a second receiver 70, which can be jointly rotated by a swivel drive 74 around a more or less vertical axis 72, slightly inclined forwards. During operation, electromagnetic waves sent out by the transmitters 64, 68 sweep in an arc over a measurement area in front of the combine harvester 10, in that the transmitters 64, 68 and receivers 66, 70 (or only elements transmitting and/or receiving their waves) are swiveled around the axis 72. In this way, the field 80 with the plants 82 standing thereon is swept along a measuring direction that extends in an arc with the shape of a circular segment in front of the combine harvester 10.

The first transmitter 64 sends out first electromagnetic waves in the form of light in the near infrared or visible wave range, while the first receiver 66 is sensitive only to this light. As a result of the selected wavelength, the light is reflected by the plants 32 when it strikes them. On the other hand, if the light goes between the plants (for example, with thin or missing groups) and strikes the round 84, it is reflected by the ground. The first transmitter 64 preferably comprises a laser for the generation of the light.

The second transmitter 68 sends out second electromagnetic waves in the micro or radar wave range, while the second receiver 70 is sensitive only to these waves. The wavelength is selected in such a way that the greatest portion of the second waves penetrates the plants and is reflected only by the ground 84. A certain although smaller fraction of the second waves is also reflected by the plants 82.

The electromagnetic waves sent out by the transmitters 64, 68 reach the ground 84 at an interval of a few meters (for example, 10 m) in the direction of movement of the combine harvester 10 in front of the crop harvesting device 18. The waves sent out by the transmitters 64, 68 can be modulated by the amplitude or in another manner, so as to improve the signal to noise ratio. By means of a transit time measurement, the evaluation device 76 accomplishes a recording of the interval and/or another measurement variable between the sensor arrangement 62 and the point where the waves were reflected. The swivel drive 74 can be constructed as a servo or stepping motor, and the sensor arrangement 62 (or only elements sending out and/or receiving their waves) continuously or gradually swivels around an angular range of, for example, 30° around the axis back and forth. The evaluation device 76 is set up to record, for any swiveling angle of the sensor arrangement 62, the individual angle around the axis 72 and the transit time of the wave, or the distance of the receiver 66, 70 and the transmitter 64, 68 from the reflection point. It would also be possible to derive from the signals of the receiver 66, 70, the echo intensities and/or pulse shapes and/or signal scatters and/or the polarization of the received electromagnetic waves and/or frequency shifts of the received electromagnetic waves and/or changes in the time course from the distance signals of the sensor arrangement 62, and to take them into consideration in the later evaluation. Subsequently, the swivel drive 74 is, activated and the sensor arrangement 62 is brought to another position. Information regarding the individual angle of the sensor arrangement 62 is available to the evaluation device 76 since it controls the swivel drive 74. A separate sensor for the recording of the swivel angle would also be conceivable, wherein the servo or stepping motor can be replaced by any motor. The angle of the sensor arrangement 62 around the axis 72 defines a measurement device, along which the transit times of the waves of the transmitter 64, 68 to the corresponding receiver 66, 70 are determined. It extends horizontally and in the shape of a circular arc, transverse to the forward direction of travel of the harvesting machine 10.

The signals of the first receiver 66 contain information regarding the height of the upper ends of the plants 82, since they are primarily reflected there. A few first waves, however, penetrate into thinner groups of plants further down, in part, down to the ground 84, and are first reflected there and received by the first receiver 66. In thinner groups, the intervals recorded by the first receiver 66, accordingly, vary more than in thicker groups. These different variations, of the intervals, dependent on the density of the group of plants, are evaluated by the evaluation device 76 and are used for the determination of the density of the group of plants. Furthermore, the measurement values of the second receiver 70 are used for the determination of a ground profile, which is used in conjunction with the heights of the upper sides of the plants 82 recorded by the first receiver 66 for a more accurate determination of the plant heights, which are also used for the determination of the number of plants.

The sensor arrangement 62 also comprises a camera 86, which looks out downward and forward from the roof of the cabin 60 at an incline onto the field 80 with the plants 82 standing thereon and in front of the crop harvesting device 18. The signals of the camera 86 are also supplied to the evaluation device 76. In other possible embodiments of the invention, the camera 86 or one or both range finders 64, 86 and 88, 70 can be omitted.

Furthermore, the harvesting machine 10 is equipped with several measurement devices 88, 92, 94, 100, and 102, which directly or indirectly record characteristics of the harvested plants 82 and respectively transmit their signals to the evaluation device 76. The evaluation device 76 records the angle position of a feeler 90 supported in such a way that it can rotate and that interacts with the crop mat in the inclined conveyor 20. The measurement device 88 accordingly records the layer thickness of the plants 82 in the inclined conveyor 20. The measurement device 92 records the drive torque or the drive performance of the threshing drum 22, which depends in turn on the quantity (volume and mass) of the collected plants 82. The measuring device 94 detects the driving torque or driving power of the blower 96 that depends on the load of the sieve 98. The measurement device 100 comprises a camera and a near-infrared spectrometer, which interact with the cleaned drain conveyed by the grain auger 48 and on one hand, with the camera and an image processing determine the cleanliness of the grain and the broken grain, fraction in the cleaned train, and on the other hand, by means of the near-infrared spectrometer, determine the grain moisture. In this respect, reference is made to the disclosure, of DE 10 2007 007 040 A1. Finally, a measurement device 1 records lost grains on the discharge of the upper sieve 98.

Figure 2:
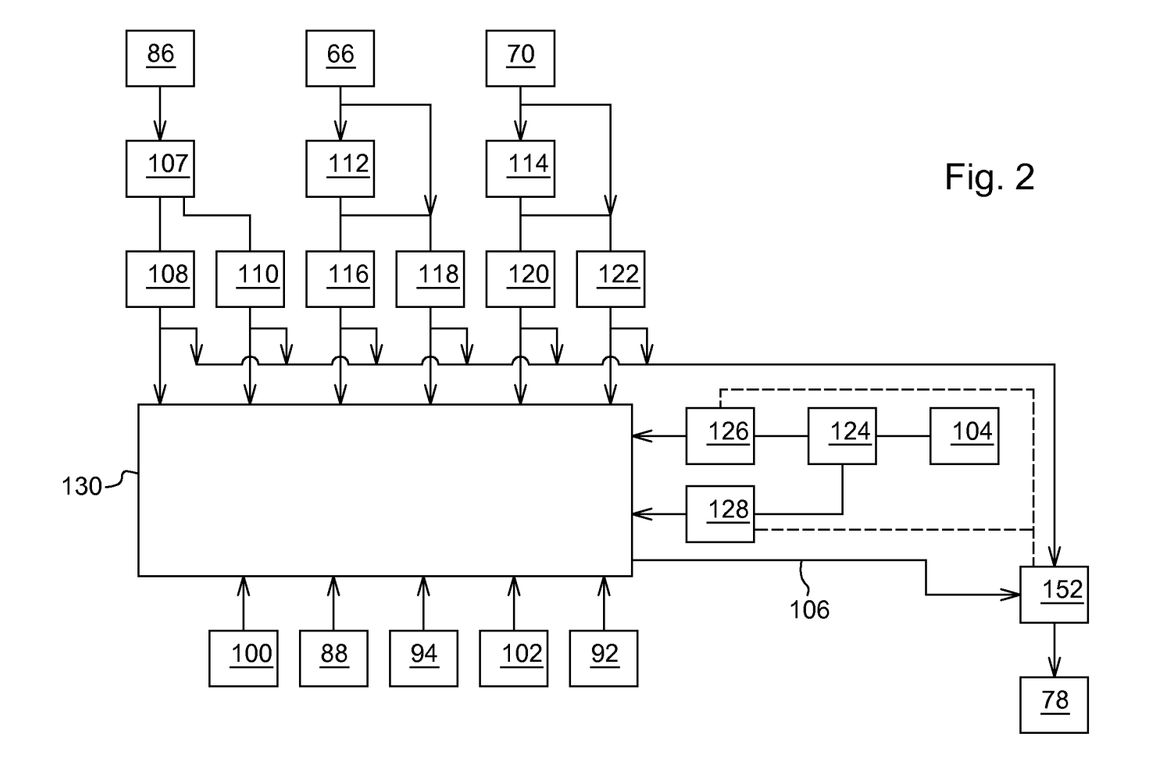
FIG. 2 is a schematic diagram for a first procedure in the operation of the arrangement.

FIG. 2 illustrates the mode of operation of the arrangement in accordance with the invention for the anticipatory assessment of plants gathered with a harvesting machine in operation. In a learning process (left part of the figure), the signals from the sensor arrangement 62 are thereby evaluated with the camera 86 and the receivers 66, 70 on the one hand, and the signals of the measurement devices 88, 92, 94, 100, and 102 on the other hand, so as to produce calibration data 106, which are subsequently (or simultaneously) used in an application process (right part of the figure), so as to convert the signals from the sensor arrangement 62, among others, into control signals for the speed specifying device 78. The calibration data 106 are produced geo-referenced on the basis of signals of a receiver 104 for signals of a satellite-based position determination system (for example, GPS, Glonass, or Galileo), and stored. The signals of the receiver 104 can also be supplemented or replaced by wheel sensors for the speed measurement and gyroscopes for the direction measurement.

In detail, statistical parameters 108, 110 are calculated from the signals of the camera 86 by means of an image processor 107, which can be integrated into the evaluation device 76 or into the housing of the camera 86 or can be constructed as an independent unit. The statistical parameter 108 is a histogram for the colors and/or the brightness of the plants 82. The statistical parameter 110 comprises texture parameters of the plants, for example, the local dimensions (thickness and/or length) of the plants, the standard deviation of the local dimensions (thickness and/or length) of the plants and the local entropy (disorder or order, that is, the alignment) of the plants. This (these) statistical parameter(s) can be derived from the total image of the camera 86 or from parts of the image of the camera, in particular, those parts that contain a representative image of the crop. The other areas of the image of the camera 86 can be ignored or used for other purposes—for example, for steering.

Furthermore, in the operation of the swivel drive 74, with the transmitters 64, 68 and the receivers 66, 70, the evaluation device 76 brings about an incremental (or continuous) sweeping of a certain angular range in front of the harvesting machine 10. The individual swivel angles and interval measurement values are thereby stored by the evaluation device 76. A first range image 112 of the first receiver 66 and a second range image 114 of the second receiver 70 are formed. From the first range image 112 and the signals of the first receiver 66, statistical parameters 116, 118 are derived, wherein in one embodiment of the invention, one of the statistical parameters 116 comprises the standard deviation in the range image 112, and the other statistical parameter 118, a histogram for the intensity of the received light over time. Statistical parameters 120, 122 are derived from the second range image 114 and the signals of the second receiver 70, wherein one of the statistical parameters 120 comprises the standard deviation in the range image 114, and the other statistical parameter 122, a histogram for the intensity of the received waves over time.

It is possible without any problem to hereby recognize if the harvesting machine 10 moves over an area of the field that has already been harvested. Signals obtained there are ignored by the evaluation device 76.

The position signals of the receiver 104 are converted by means of a stored card 124 into data 126 with regard to the actual site of the harvesting machine 10, for example, with regard to the type of soil and/or the topography (for example, the magnitude and the direction of the ground inclination and the elevation above sea level), and furthermore made available as position signals 128.

Finally, the measurement devices 88, 92, 94, 100, and 102 generate the signals described above with regard to the individually recorded characteristics of the harvested plants 82. The statistical parameters 108, 110, 116, 118, 120, 122, the position signals 128 and data 126, and the signals of the measurement devices 88, 92, 94, 100, and 102 are conducted to an evaluator 130 of the evaluation device 76. In each case, signals that are at least approximately correlated with the same plants 82, that is, the individual time and location differences in the recording of the signals and data are taken into consideration, are thereby linked. The evaluator 130 is able, with the use of a hidden Markov model or dynamic Bayes influence factor model, to independently determine the relationships between the statistical parameters 108, 110, 116, 118, 120, 122 derived from the signals of the sensor arrangement 62, and the signals of the measurement devices 88, 92, 94, 100, and 102, and with the aid of these now determined relationships, to generate the calibration data 106. With regard to the details of the hidden Markov model, reference is made to the technical literature (see http://en.wikipedia.org/wiki/Hidden_Markov_model and the references mentioned there).

Figure 3:
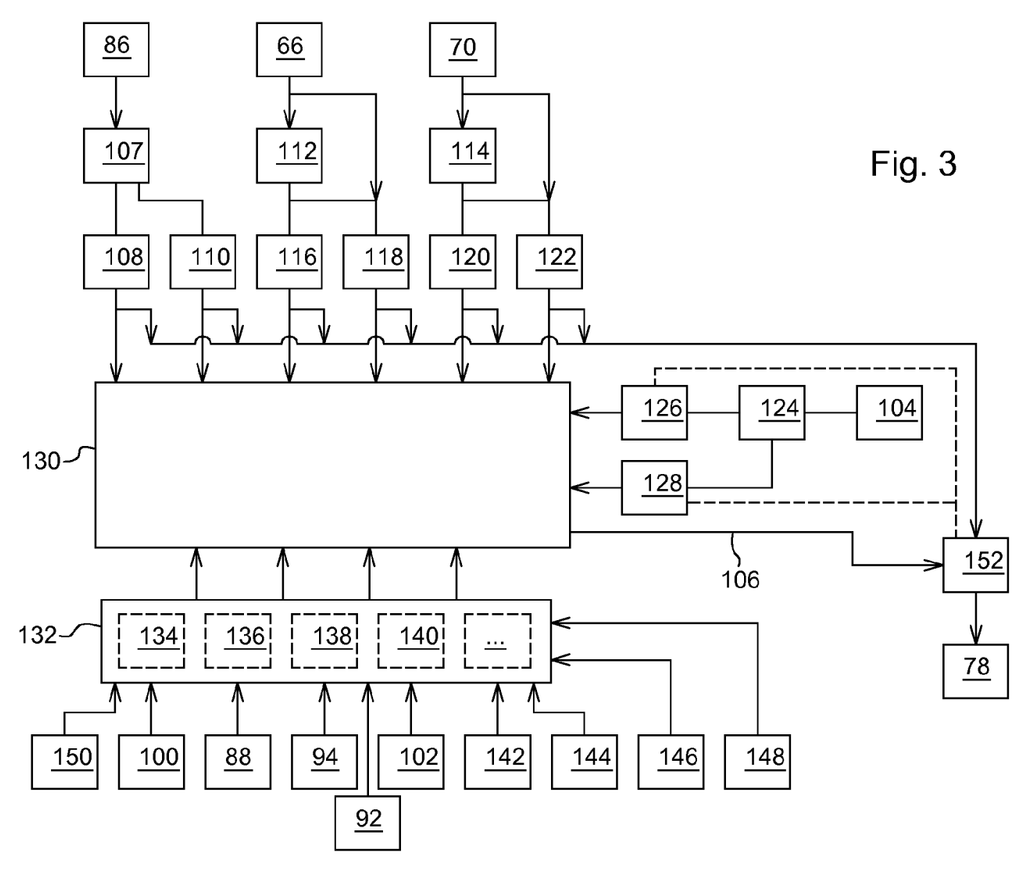
FIG. 3 is a schematic diagram for a second procedure in the operation of the arrangement.

In the second embodiment according to FIG. 3, an additional evaluator 132 is used in contrast to the embodiment in accordance with FIG. 2, which from the signals of the measurement devices 88, 92, 94, 100 and 102 and signals of one or more additional sensors (sensor 142 for separation losses of the shaker 32 or an axial separation direction; sensor 144 for the returns volume, sensor 148 for the cutting height, sensor 148 for the advance speed and data 150 for the working width of the crop harvesting device 18), first calculates the characteristics of the crop or the field, namely, the crop moisture 134, the volume of the crop 136, the grain yield 138 and the navigability 140 of the field, and perhaps also, other characteristics of the crop and/or the field. The evaluator 132 is hereby used for the conversion of the measurement variables obtained on the harvesting machine 10 into the characteristics of the crop or of the field. The characteristics of the crop or of the field calculated by the evaluator 132 (instead of the signals of the measurement devices 88, 92, 94, 100, 102 in accordance with the first embodiment of FIG. 2) are then conducted to the evaluator 130. The characteristics of the field (in particular, with regard to the navigability) can also be transmitted to other machines, in particular, transport vehicles for the transporting of the crop or vehicles for the subsequent processing of the soil.

For the adjustment of the forward speed of the harvesting machine 10 by means of the speed specification device 78 and/or other working parameters of the harvesting machine 10, such as the threshing drum rpm, the threshing drum gap, the blower rpm, or the sieve opening, the calibration data 106 and the measurement values of the sensor device 62 are used in the form of signals of the camera 86 and the receivers 70, 66 by the control unit 152, which is part of the evaluation device 76 and can be integrated in its housing or constructed as a separate unit, so as to independently adjust the working parameters of the harvesting machine 10. To this end, in particular, the statistical parameters 108, 110, 116, 118, 120, 122 are supplied to the control unit 152, although in addition, the range images 112, 114 and the signals of the image processing 107 can also be supplied to the control unit 152. The signals of the measurement devices 88, 92, 94, 100, 102 could also be supplied to the control unit 152 as feedback data. In the embodiment according to FIG. 3, the characteristics of the crop and/or the field calculated by means of the evaluator 130 can also be supplied alternatively or additionally as feedback data to the control unit.

The control unit 152 is thus able, with the aid of the calibration data 106 and the measured statistical parameters 108, 110, 116, 118, 120, 122, and perhaps other data from the sensor device 62, to determine the individual actual characteristics (like, in particular, the throughput) of the plants 82 that are soon to be gathered and on the basis of this, to adjust in an anticipatory manner the speed specification device 78 and/or the other aforementioned working parameters of the harvesting machine 10. Since the calibration data 106 are geo-referenced and stored with information regarding the individual type of soil and/or topography of the field, calibration data 106, which were obtained in the vicinity of the individual position and/or with a similar type of soil and/or topography, are taken into consideration to a greater extent for exclusively) by the control unit 152 than other data 106 obtained at a greater distance or with another type of soil and/or topography.

The calibration data 106 can be generated continuously, wherein older calibration data can either be deleted or taken in consideration to a lesser and lesser extent as time goes on or retained and combined with more recent calibration data, or they are generated only over as certain time period and stored for a longer period of time, possibly until the next harvest or even longer and used by the control unit 152.

The invention under consideration is not only suitable for standing plants 82 as previously described, but rather also for plants lying in a swath or lying flat.

Having described the preferred embodiment, it will become apparent that various modifications can be made without departing from the scope of the invention as defined in the accompanying claims.

The invention claimed is:

1. An arrangement for the anticipatory assessment of plants (82) to be gathered with a harvesting machine (10), the arrangement comprising:

a sensor arrangement (62), including at least one of a first camera (86), a first transmitter (64) for transmitting first electromagnetic waves in form of light in the near infrared wave range and an associated first receiver (66), and a second transmitter (68) for transmitting second electromagnetic waves in the radar wave range and an associated second receiver (70), the sensor arrangement (62) being mounted on the harvesting machine and directed for a non-contact interaction with plants (82) on a field (80) at a preselected distance from the harvesting machine in a direction of forward movement of the harvester for generating signals representing at least one anticipated characteristic of the plants (82) including at least one of a histogram for colors, plant texture, a histogram for intensity of infrared waves and a standard deviation in range image, and from which at least one anticipated statistical parameter (108, 110, 116, 118, 120, 122) may be derived;

at least one measurement device including at least one of a crop mat thickness sensor (88), a threshing drum drive torque sensor (92) and a blower drive torque sensor (94) for measuring at least one actual characteristic of plants (82) gathered by the harvesting machine (10) and related to said at least one anticipated characteristic and generating a signal representative of said at least one actual characteristic and from which at least one actual statistical parameter (108, 110, 112, 116, 118, 120, 122) may be calculated;

an evaluation device (76) is coupled for receiving signals from said at least one sensor of the sensor arrangement (62), representing the at least one anticipated characteristic, and from said at least one measurement device (88, 92, 94, 100, 102), representing the at least one actual characteristic, and acts in response to receiving the signals to record the at least one anticipated characteristic and the related at least one actual characteristic, the evaluation device (76) acting for producing calibration data (106) with the aid of signals of the at least one measurement device (88, 92, 94, 100, 102) and from signals of the statistical parameters (108, 110, 116, 118, 120, 122) derived from the sensor arrangement (62), the evaluation device (76) acting for calculating the at least one characteristic of plants (82) to be gathered with the aid of statistical parameters (108, 110, 116, 118, 120, 122), which are derived from the signals of the sensor arrangement (62) representing characteristics of the plants (82) to be gathered, and the calibration data (106); the improvement comprising: said evaluation device (76) being operable for automatically determining connections between the statistical parameters (108, 110, 116, 118, 120, 122), derived by the calculation device (76) from the signals of the sensor arrangement (62), and derived from the signal of the at least one measurement device (88, 92, 94, 100, 102) and to take these determined connections into consideration later in a recalculation of the at least one anticipated characteristic of the plants (82) to be gathered directly by using the signals of the sensor arrangement (62) corresponding to the at least one characteristic and the determined connection.

2. The arrangement according to claim 1, wherein said at least one anticipated characteristic of the plants (82) is one of the total group density of the plants (82) or the moisture of the plants (82).

3. The arrangement according to claim 1, wherein the harvesting machine includes an inclined conveyor (20) for receiving and conveying the plants (82) to a crop processing device, and wherein the at least one measurement device (88, 92, 94, 100, 102) interacts directly with the plants (82) received and processed by the harvesting machine (10) and records an operating value of at least one of the crop conveyor and the crop processing device.

4. The arrangement according to claim 3, wherein said at least one measurement device is layer thickness measurement device (88) for measuring the thickness of the layer of harvested plants (82) being conveyed on the inclined conveyor (20) and generating a signal representing the measured layer thickness.

5. The arrangement according to claim 3, wherein said crop processing device of the harvesting machine includes a threshing drum (22) for receiving the harvested plants (82) from the conveyor (20); and wherein said at least one measurement device is the crop mat thickness sensor (88) which generates a signal representative of the thickness of the crop on the conveyor (20), this signal being used by the evaluating device (76) for calculating a first actual crop throughput signal and wherein at least a second measurement device is the drive torque sensor (92) which senses the torque required for rotating the threshing drum and for generating a signal representative of said torque, this signal being used by the evaluating device (76) for calculating a second actual throughput value.

6. The arrangement according to claim 3, wherein said crop processing device of the harvesting machine includes a threshing drum (22) for receiving the harvested plants (82) from the conveyor (20) and a separating device (32) for receiving threshed remnants of the harvested plants (82) from the threshing device (22); and said measurement device further including a grain loss measurement device (102) which measures and generates a signal representative of grain loss from the separating device 32.

7. The arrangement according to claim 1, wherein the at least one sensor of said sensor arrangement (62) is the camera (86) for generating images and partial images; and said evaluator (76) includes an image processor (107) being coupled for receiving said images, and in that the statistical parameters include at least one of the texture parameter (110), the color histograms (108) derived by the evaluator (76) from the images and partial images of the camera (86).

8. The arrangement according to claim 1, wherein said at least one sensor arrangement (62) includes the first transmitter (64) together with the first receiver (66) and the second transmitter (68) together with the second receiver (70) for scanning the plants with electromagnetic waves, and in that the at least one statistical parameter is (116, 118, 120, 122) echo intensities derived from at least one of distance signals of the first transmitter together with the first receiver and the second transmitter together with the second receiver, pulse shapes, signal scatter, polarization of the electromagnetic waves, frequency shifts of the electromagnetic waves, and changes during the course of time of the variables derived from the distance signals.

9. The arrangement according to claim 1, wherein the harvesting machine includes rotatable driven ground elements (14); an advance speed specifying device (78) for controlling the speed at which the ground elements (14) are driven; said evaluation device (76) being coupled for sending control signals, determined with the aid of the recalculated at least one characteristic of the plants (82) to be gathered, to at least the advance speed specifying device so as to regulate the advance speed.

10. The arrangement according to claim 1, wherein said harvesting machine is equipped with a position signal receiver (104) coupled to the evaluation device (76); wherein known characteristics of the field together with previously determined calibration data, correlated with the field position where the data was gathered, is stored for retrieval by the evaluation device 76; and the evaluation device (76) being operable to take into consideration, during the application of the calibration data (106) to arrive at the first value of the at least one, the position of the harvesting machine (10) in the field and the known characteristics of the field at the position of the harvesting machine.

11. The arrangement according to claim 1, wherein the evaluation device (76) can be operated to use a hidden Markov model for the automatic determination of the relationships between the at least one anticipated statistical parameter (108, 110, 116, 118, 120, 122) derived from the signals of the sensor arrangement (62), and the signal of the at least one measurement device (88, 92, 94, 100, 102) representing the at least one actual characteristic of the gathered plants (82).

12. The arrangement according to claim 1, wherein the harvesting machine (10) includes a second sensor arrangement comprising at least one of a separation loss sensor (142), a returns volume sensor (144), a cutting height sensor (146), and an advance speed sensor (148) and includes working width data (150), with the second sensor arrangement and the working width data being respectively coupled to and made available to a second evaluator (132) of the evaluation device (76) which can be operated so as to determine, with the aid of at least one signal from the second sensor arrangement and working width data into at least one characteristic of the plants (82) or of the field (80) including crop moisture (134), a volume of the crop (136), a grain yield (138), and the navigability (140) of the field, and to determine the calibration data (106) with the aid of a comparison with the at least one calculated characteristic of the gathered plants (82) from the at least one signal of the measurement device (88, 92, 94, 100, 102).

13. A method for the anticipatory assessment of plants (82) to be gathered with a harvesting machine (10), with the following steps:
generating first signals representing at least one characteristic of the plants (82) by using a sensor arrangement (62) with non-contact interaction with plants (82) on a field;
generating second signals (128) representing a geo-referenced position of the plants (82) sensed by the sensor arrangement (62);

gathering into the harvesting machine the plants represented by the generated signals of the sensor arrangement (62);

generating third signals representing at least the one characteristic of the plants actually gathered by the harvesting machine (10) with a contact interaction with the plants actually gathered into the harvesting machine by using a crop characteristic measurement arrangement (88, 92, 94, 100, 102);

using an evaluation device (76) for producing calibration data (106) by comparing the first signals representing the at least one characteristic of the plants to be harvested with the third signals representing the at least one characteristic of the plants gathered by the harvesting machine (10) with the aid of the third signals of the measurement arrangement (88, 92, 94, 100, 102) and from statistical parameters (108, 110, 116, 118, 120, 122) derived from the signals of the sensor arrangement (62) by the evaluation device (76), and recalculating the at least one characteristic of the plants (82) to be gathered by using the evaluation device (76) to automatically determine relationships between the statistical parameters (108, 110, 116, 118, 120, 122) derived from the signals of the sensor device (62), and the signals of the measurement device (88, 92, 94, 100, 102), and taking into consideration these relationships during said recalculating of the at least one characteristic of the plants (82).

\* \* \* \* \*